(12) United States Patent
Peri

(10) Patent No.: US 6,253,373 B1
(45) Date of Patent: Jun. 26, 2001

(54) TRACKING LOOP ENTRY AND EXIT POINTS IN A COMPILER

(75) Inventor: Ramesh V. Peri, Allentown, PA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/946,352

(22) Filed: Oct. 7, 1997

(51) Int. Cl.⁷ .................................................. G06F 9/45

(52) U.S. Cl. ............................................. 717/9; 717/5

(58) Field of Search .......................... 395/709; 717/9, 717/5

(56) References Cited

U.S. PATENT DOCUMENTS

| | | | |
|---|---|---|---|
| 5,212,794 | * | 5/1993 | Pettis et al. ............................. 717/9 |
| 5,361,354 | * | 11/1994 | Gryzck ..................................... 717/9 |
| 5,386,562 | * | 1/1995 | Jain et al. ................................ 717/9 |
| 5,457,799 | * | 10/1995 | Srivastava ............................... 717/9 |
| 5,535,394 | * | 7/1996 | Burke et al. ............................. 717/9 |
| 5,579,520 | * | 11/1996 | Bennett ................................... 717/4 |
| 5,613,121 | * | 3/1997 | Blainey .................................... 717/9 |
| 5,671,419 | * | 9/1997 | Carini et al. ............................ 717/9 |
| 5,734,908 | * | 3/1998 | Chan et al. .............................. 717/9 |
| 5,805,863 | * | 9/1998 | Chang ..................................... 717/9 |
| 5,809,308 | * | 9/1998 | Tirumalai ................................ 717/9 |
| 5,854,933 | * | 12/1998 | Chang ..................................... 717/9 |
| 5,920,724 | * | 7/1999 | Chang ..................................... 717/9 |
| 5,930,510 | * | 7/1999 | Beylin et al. ............................ 717/9 |
| 5,933,643 | * | 8/1999 | Holler ...................................... 717/9 |
| 5,950,009 | * | 9/1999 | Bortnikov et al. ...................... 717/9 |
| 5,960,198 | * | 9/1999 | Roediger et al. ....................... 717/4 |
| 6,006,033 | * | 12/1999 | Heisch .................................... 717/9 |
| 6,026,240 | * | 2/2000 | Subramanian .......................... 717/9 |

OTHER PUBLICATIONS

Aho et al.; Compilers: Principles, Techniques, and Tools. Addison–Wesley Publishing Company, Reading, MA, Chapters 8–10, Sep. 1985.*
Borland International, Inc.; Turbo Profiler, Version 2.0: User's Guide. Borland International, Scotts Valley, CA, Chapters 1–4, 1988.*
Microsoft Corporation; Microsoft Visual C++: Development System for Windows Version 1.0. Microsoft Corporation, Chapters 1–3, 1993.*
Larus, J.; "Loop–Level Parallelism in Numeric and Symbolic Programs". IEEE/IEE Xplore[online], IEEE Transactions on Parallel and Distributed Systems, v4, iss7, p812(15), Jul. 1993.*
Schnarr et al.; "Instruction Scheduling and Executable Editing". IEEE/IEE Xplore[online], Proceedings of the 29th Annual IEEE/ACM International Symposium on Microarchitecture, 1996, p288(12), Dec. 1996.*

(List continued on next page.)

Primary Examiner—James P. Trammell
Assistant Examiner—Kelvin Booker

(57) ABSTRACT

The inventive system and method separates the tracking of the loop entry and exit points and loop optimization information, from the generation of the instrumentation code at the loop entry and exit points. Thus, the different phases in the compiler can proceed in an optimal manner with respect to producing the best optimized code. This invention allows the correlation of the source code loops to the object code loops, even though different optimizations are being applied to loops. A loop information database is used to store a history of optimizations about loops, as well as loop entry and exit points, instead of using loop data structures that must be globally maintained. The invention detects the loops in the program code, and assigns a unique identifier to each detected loop. The entry and exit points, as well as the identifier are stored in the database. Any changes to the loops from optimizations are also stored in the database. This technique enables profilers to collect and report the profile information about loops to the user in an intelligible manner.

28 Claims, 2 Drawing Sheets

OTHER PUBLICATIONS

Ball et al.; "Efficient Path Profiling". IEEE/IEE Xplore [online], Proceedings of the 29th Annual IEEE/ACM International Symposium on Microarchitecture, 1996, p46(12), Dec. 1996.*

Larus, J.R.; "Efficient Program Tracing". IEEE/IEE Xplore [online], Computer, v26, iss5, p52(10), May 1993.*

Sarkar, V.; "Determining Average Program Execution Times and their Variance". ACM Digital Library[online], Proceedings of the SIGPLAN '89 Conference, p298(15), Jun. 1989.*

Megiddo et al.; "Optimal Weighted Loop Fusion for Parallel Programs". ACM Digital Library[online], Proceedings of the 9th annual ACM Symposium on Parallel Algorithms and Architectures, p282(10), Jun. 1997.*

Weise et al.; "Value Dependence Graphs: Representation Without Taxation". ACM Digital Library[online], ACM SIGPLAN–SIGACT Symposium on Principles of Programming languages, p297(14), Jan. 1994.*

Burke et al.; "Interprocedural Optimization: Eliminating Unnecessary Recompilation", ACM Digital Library[online], ACM Transactions on Programming Languages and Systems, v15, n3, p367(33), Jul. 1993.*

Pingali et al.; "Dependence Flow Graphs: An Algebraic Approach to Program Dependencies". ACM Digital Library [online], Proceedings of the 18th annual ACM symposium on Principles of programming languages, p67(12), Jan. 1991.*

Auslander et al.; "Fast, Effective Dynamic Compilation". ACM Digital Library[online], ACM SIGPLAN '96, p149(11), May 1996.*

Colby et al.; "Trace–Based Program Analysis". ACM Digital Library[online], Proceedings of the 23rd ACM SIGPLAN–SIGACT, p195(13), Jan. 1996.*

Cmelik et al.; "Shade: A Fast Instruction–Set Simulator for Execution Profiling". University of Washington and Sun Microsystems Inc.., 1993.*

Ball et al.; "Optimally Profiling and Tracing Programs". ACM Digital Library[online]. Annual Symposium on Principles of Programming Languages, pp. 59–70, Jan. 1992.*

Hall, R..; "Call path profiling". ACM Digital Library [online]. International Conference on Software Engineering, pp. 296–306, May 1992.*

Wu et al.; "Static Branch Frequency and Program Profile Analysis". ACM Digital Library[online]. International Symposium on Microarchitecture, pp. 1–11, Nov. 1994.*

* cited by examiner

TRACKING LOOP ENTRY AND EXIT POINTS IN A COMPILER

TECHNICAL FIELD OF THE INVENTION

This application relates in general to computer system compilers and in specific to tracking loops, and loop entry points and exit points in the compiler.

BACKGROUND OF THE INVENTION

Compilers convert a source program that is usually written in a high level language into low level object code, which typically comprises a sequence of machine instructions or assembly language. The constructs in the source program are also converted into a sequence of assembly language instructions in the executable program. To achieve the highest possible efficiency of operation, it is essential to understand exactly how the program executes. This would allow the program developer to concentrate on improving the parts of the program that are inefficient. Consequently information such as the length of time that the program takes to execute, and other statistics about the program execution, at the function level, at the loop level, and at the basic block level must be determined.

The compilers track loops so that the profilers can instrument these loops and collect information about the loops. In order for the compilers to track the loops, they need to perform some analysis on these loops. This analysis determines the location of the loop entry points and the loop exit points. Instrumentation code is then placed at the loop entry and the exit points identified by the analysis phase by the profiler. The instrumentation code allows the collection of information about the loops. An important requirement of instrumentation code is that it must not affect the code that is normally generated by the compiler. Thus, the instrumentation code must be placed after all of the optimizations have been completed. This process is complicated since loops can be nested inside of each other, and exit points can take the control flow out of a loop nest. Moreover, optimization phases may have taken place between the loop analysis and code generation phases that invalidates the information collected during the loop analysis phase. It may not be possible to update this information as loop control structures may have changed or disappeared after the analysis phase due to optimizations.

One prior art solution to this problem is to repeat the loop analysis several times throughout the compilation process. Since this loop analysis phase is carried out in a number of different places, the loops that are detected in each phase will be different from the previous phase because of the optimizations that happen between these phases. It becomes very difficult for the compiler to correlate the loops that are manifesting in the object code with the loops that are present in the source code. This will cause problems in trying to associate the information that is collected about the loops in the object code with the loops that are present in the source code.

One solution that the compilers use is to keep track of all the loop data structures for the whole compilation process. Whenever any optimization happens, the loop data structures are updated to reflect the loops that are present in the object code. This uses a great deal of memory, because the loop data structures must be maintained in memory for the whole compilation process. But for the need to track the loops, these loop data structures could have been eliminated once the loop optimizations have been performed in the compilers. Also, the compilation time increases because whenever an optimization takes places (even when it is not a loop optimization), a check must be performed to determine whether the loop data structures need to be updated, and then perform the updating if the need exists.

The other technique that prior art compilers use to overcome this problem is to perform the loop analysis and loop optimizations right before the code generation, so that any of the loops that have manifested in the object code can be correlated back to the source code. This is not the ideal place for the loop analysis and the loop optimizations to be performed, because it may not produce optimal code. The different phases of the compilation process have to be driven by the observations that the compiler developers make by examining the collected information on the source program that is being compiled. Because the different phases of the compilation process is limited by the information collection process, this lack of information has the effect of producing sub-optimal code for the program since all possible optimizations may not have been performed.

Another problem of the prior art compilers is their placement of the instrumentation code in loop entry and exits points. Some prior art compilers place the instrumentation code after the loop analysis phase, which guarantees accurate placement since the locations of the entry and exits points have not been changed. However, then the compilers perform optimization phases, and the subsequent optimization phases can optimize away the instrumentation code. Thus, this would render subsequent analysis of the code by the developers useless. Moreover, the resulting optimized code produced by the compiler in the presence of this instrumentation may be different than code produced if the instrumentation is not present.

Compilers comprise a number of different phases, and each of these phases transform the program to produce fast executing code through optimizations, and in the process the correlation between the source code loops and object code loops is lost. Thus, there is a need in the art to keep track of the information, so that the correlation is possible between the loops in the object code and the loops in the source code. This is important because the developer will only see the loops that are present in the source code, but only collect information about the loops that are in the object code. Thus, in order for the developer to adjust the source code for optimal performance by observing the behavior of the loops in the object code, the developer needs to be able to correlate the loops in the source code with the loops in the object code. As long as there are problems associated with the instrumentation code generation phase and the loop analysis phase, this will not be possible.

Therefore, there is a need in the art to separate the instrumentation code generation from the loop analysis phases in the compiler, so that each can be performed at their respective appropriate points in the complication process, depending on the requirements that would construct the most optimal code.

SUMMARY OF THE INVENTION

These and other objects, features and technical advantages are achieved by a system and method which separates the tracking of the loop entry and exit points and other loop information, from the production of the instrumentation code at the loop entry and exit points. In other words, the instrumentation code generation is separated from the loop analysis, and consequently, they need not be performed in the same phase in the compiler.

This invention allows the different phases in the compiler to proceed in an optimal manner with respect to producing the best optimized code, as opposed to trying to collect the information in an artificial manner imposed by the requirements of the compiler. The loop analysis phase and the optimization phase can occur anywhere in the compilation process, based solely on achieving optimal code, instead of correctly generating instrumentation code for the profiler.

This invention allows the correlation of the source code loops to the object code loops, even though different optimizations are being applied to loops. For example, if during an optimization process a loop is broken up into two different loops, enough information is maintained in the compiler to allow the developer to know that the two loops that are in the object code are from a single loop in the source code. Thus the developer, in viewing the timing information about the object code, knows that a change to the single source code loop will affect the performance of the two object code loops.

This invention does not degrade the efficiency of the compilation process, in that global data structures about the loops do not have to be maintained. More specifically, the loop information database contains history of optimizations about loops, not the loop data structures. A loop data structure contains much more information, like back-edges. The basic blocks in the data structures do not contain any information (history) of what or how it came into existence. Prior art use global data structures to store information about loops that would otherwise be lost at the end of each phase, and is needed in the subsequent phases. This is important because many of the optimizations that are performed in the compiler do not have anything to do with loops. The prior art compilers would require the maintenance and updating of the global loop data structures even though it is not necessary for correct compilation of the source program by the compiler.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DESCRIPTION OF THE PREFERRED EMBODIMENTS

As a source program goes through the compilation process, the locations in the program where instrumentation code is to be inserted needs to be tracked through the compilation process. These locations correspond to the loop entry and exit points. As the program goes through the compilation process, and especially when compiler optimizations occur, the loop entry and exit points may get shifted around in the program. The invention keeps track of the shifting locations of the loop entry and exit points between the source code and the object code, so that at the appropriate point in the process, instrumentation code can be correctly inserted at the proper points.

For example, suppose there is a loop having four lines of code within a ten line section of source code, and during the compilation process, it is determined that the third line of the ten lines of code is the code instruction that corresponds to the beginning of the loop. As these ten instructions go through different phases of the optimizations in the compilation process, the third instruction might get moved around. The instruction that is the beginning of the loop may become the second instruction or the fourth instruction in the final program as instructions are inserted, relocated, or deleted during the compilation process.

Figure 1:
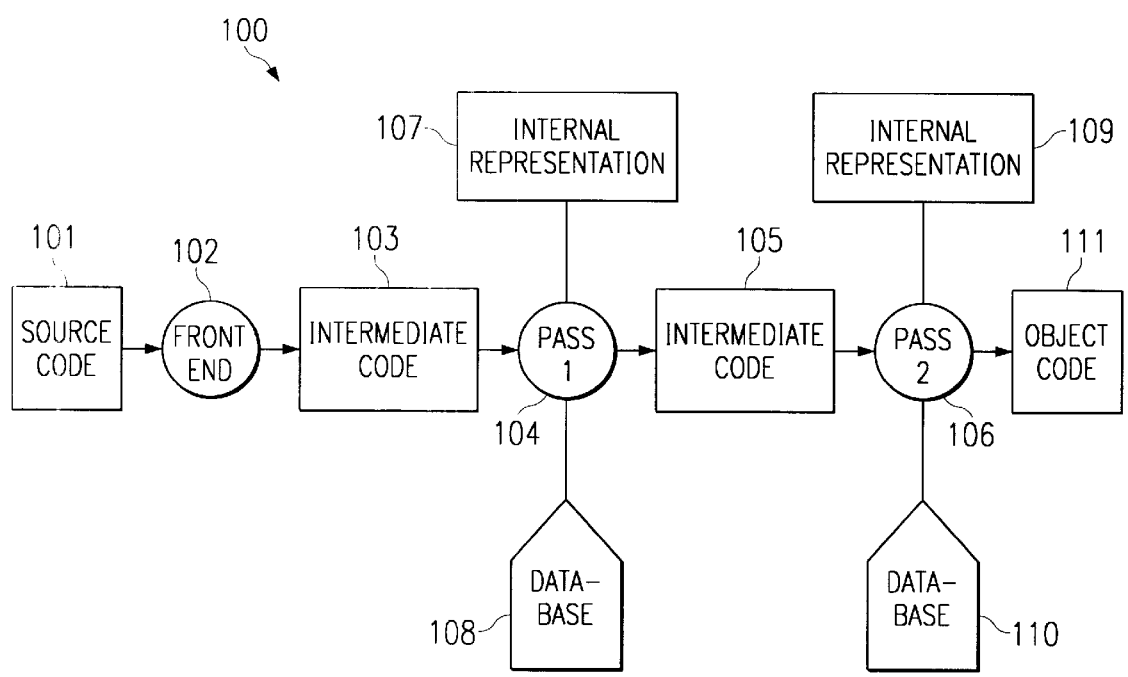
FIG. 1 depicts the structure of the inventive compilation environment.

FIG. 1 shows the structure of the inventive compilation environment 100. The source code file 101 is read in and checked for syntax errors or semantic errors by a component of the compiler 100 known as front end 102. Source code 101 is converted into intermediate code 103 by front end 102. Intermediate Code 103 then is delivered to Pass 1 104 of the compiler 100, which performs some optimizations and collects some information about source program 101. The information that is collected in Pass 1 104 is stored in loop information database (LID) 108. LID 108 contains information about the different source constructs and the different language constructs that are used in the source program, but LID 108 can contain any information about the source program. LID 108 also contains information about the loops, and more specifically, information about the loop entry and exit points, and optimizations on the loops. The loop data structures exist only during the loop analysis phase, as opposed to all other phases of compilation, that may not have anything to do with loops.

Pass 1 104 creates its own internal representation 107 of the intermediate code 103 of source program 101. Pass 1 104 will operate on internal representation 107 of intermediate code 103. Pass 1 104 improves the structure of intermediate code 103 and thereby increases run-time performance. Pass 1 104 performs transformations that would allow intermediate code 103 to be executed faster when the code is subsequently processed by other phases of the compiler. Any information collected by Pass 1 104 is stored in LID 108. Once Pass 1 is complete, it creates intermediate code 105 via a code generator (not shown), which is then presented to Pass 2 106 of the compiler.

Pass 2 will have its own internal representation 109 of the now-modified source code 101, and this internal representation 109 can be different from internal representation 107, or it could be the same. Once the Pass 1 is finished, its internal data representation 107 including internal data structures are completely destroyed. All of the information, including the information in LID 108, is encoded into the intermediate code 105 and passed on to Pass 2 106.

Pass 2 106 is going to use the information in intermediate code 105 to build its own internal representation 109. Once Pass 2 has performed all of its analysis on internal representation 109, then any information developed from this analysis is stored in loop information database (LID) 110. LID 110 can contain additional information from the information it stored in LID 108 to reflect additional optimizations performed in Pass 2. The LID 110, although created by the compiler, is considered to be separate from the compiler as it survives the compilation process and is used by a loop profiler. Data structures, such as global flow control graphs, do not survive the compilation process, and thus are not separate from the compiler. After Pass 2 has completed all of its analysis and optimizations of intermediate code 105, it then produces object code 111 via the back end or object file generator (not shown). Object code 111 contains a sequence of machine instructions or low-level assembly language instructions that are the result of translating the high level source statements in source code file 101. However, source code 101 may be divided up into smaller source files, especially if the source program is very large. Then the compiler will process each file of the multiple source code files into a respective object file 111. These object files 111 are then processed by a linker (not shown), which combines the different object files, and produces an executable program. The executable program is then able to be directly executed on a computer (not shown).

FIG. 1 depicts the compilation process as having two passes, namely Pass 1 104 and Pass 2 106. However, a compiler may have only one pass, or it may have three or more passes. Pass 1 104 includes phases of the compiler which perform high-level optimizations like function inlining, or loop optimizations such as loop peeling or loop unrolling. Pass 2 106 performs some low-level optimizations like dead code elimination or strength reduction. Pass 1 104 optimizations are more specific to highlevel constructs in the program, while Pass 2 106 optimizations are more specific to the architecture of the machine on which the program executes. High-level constructs are functions or loops, and optimizations like function inlining, loop jamming, loop unrolling, etc., are performed in Pass 1 and optimizations like register allocation, instruction scheduling, etc., are done in Pass 2 of the compiler.

The tracking technique that tracks the loop optimizations with respect to loop entry points and exit points, will work with respect to any number of passes that are present in the compiler. For example, Pass 1 104 may perform loop analysis, and identify the loops that are present in the source program 101. These loops are recorded in the LID database 108, so that information can be transmitted to other passes in the compiler 100. The Pass 1 may also perform some optimizations on these loops, which would then be recorded in the LID database 108 and presented to subsequent passes in the compiler 100.

The technique for tracking information about loops comprises six different steps. Step one is performing the loop analysis phase, which is also known as interval analysis, to detect the loops in the code. This loop analysis phase can be performed in different passes of the compiler. For instance, in FIG. 1 this is performed in Pass 1, as well as in Pass 2. This is a decision made by compiler developers since they found that some loop optimizations like loop unrolling, loop jamming, loop peeling, etc. are best performed in Pass 1 and other optimizations like partial loop unrolling and software pipelining are best performed in Pass 2 to produce optimal code. Note that this invention works in either case and does not mandate or influence when and/or how many times the loop analysis or loop optimizations must be performed. During this loop analysis phase, the loop constructs of the program are recognized as well as the entry points and exits points. These items are recorded in the database shown in 108 of FIG. 1.

In step two, once the loops have been identified by the loop analysis phase, each loop that exists is given a unique loop identifier. This unique identifier is then recorded in the database of information that is being collected by Pass 1 104.

In step three of the program, the information collected by Pass 1 104 is transferred, via intermediate code 105 to Pass 2 106. Pass 2 will then construct the basic blocks and the data flow graph in the usual manner. The data flow graph is an internal data structure to the compiler. The data flow graph is a directed graph which contains the basic blocks interconnected by arcs which depict the flow of control from one basic block to another basic block. The basic blocks are the nodes on the graph which are sequences of instructions or code that are executed without a change in the control flow. When Pass 2 receives the information from Pass 1 104 about the loop entry points, it then records these loop entry points in the basic blocks. The basic blocks, being the data structure in the compiler, are fairly immutable in the compilation process, which means that any information that is recorded in the basic block will remain therein and not be moved.

Figure 2:
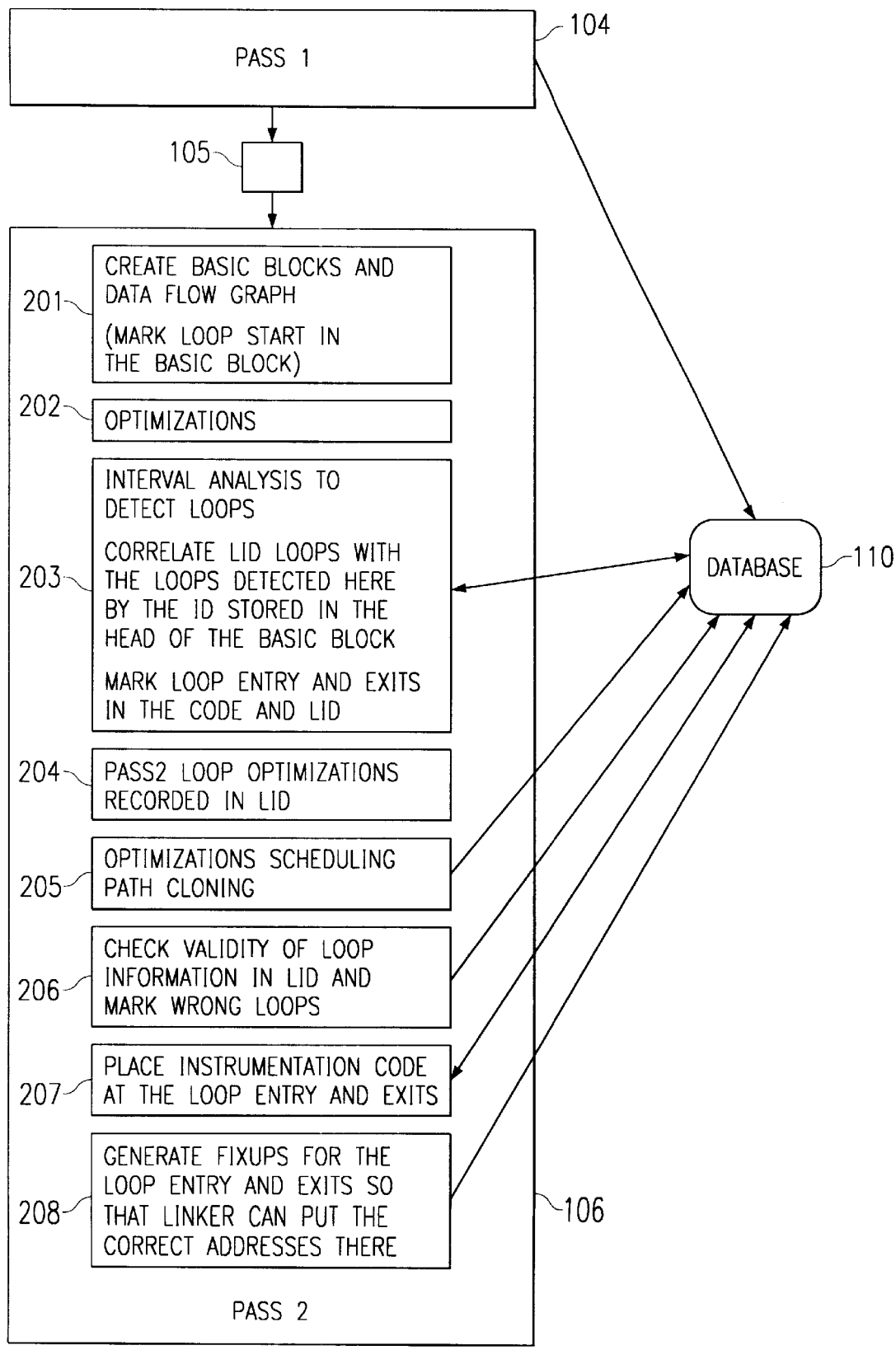
FIG. 2 depicts the Pass 2 phase of the compiler interacting with the loop information database.

FIG. 2 depicts in detail the interaction of Pass 2 and LID database 110. Step three comprise boxes 201 to 205. Initially, Pass 2 106 creates the basic blocks and the data flow graph from intermediate code 105 from Pass 1 104. The creation of the basic blocks is shown in box 201. Pass 2 stores the loop ID, if present, in the box 203 in the basic block to which that loop ID belongs to. It is then going to perform some optimizations on the data flow graph that was created in box 201, as shown in box 202. These optimizations will change the information in the basic blocks recorded earlier about the different loops. These optimizations are dead code elimination, strength reduction, and so on.

After these optimizations are performed, Pass 2 is going to perform the interval analysis, as shown in box 203. This interval analysis collects information about the basic blocks which are the heads of the loops, and then examines the information about the loops that were detected by Pass 1. It then correlates the loops it has detected with the loops that were detected by Pass 1 by looking at the loop IDs stored in the basic blocks that are heads of loops. The interval analysis also detects the exit points of the loops. Note that some loop analysis algorithm may not detect the exit points. In this case, the technique subsequently described herein is to detect these exit points. Then it marks the loop entry and exit points in the loop information database. In Pass 2, the loops undergo further optimization, as shown in box 204. Any of the loops that are optimized here are recorded in the loop optimization database as being optimized.

After interval analysis is done in box 203 and loop optimizations are done in box 204, the interval analysis data structures, which hold information about loops, can be destroyed. Then other non-loop optimizations like instruction scheduling and path cloning are performed which may change the loop information that was recorded into LID 110 in box 204.

The arrows in FIG. 2 depict how information exchange is occurring between the passes of the compiler and the loop information database. An arc which has arrows on both ends means that the information exchange is in both directions. Thus, that information that is present in the loop information database is influencing the performance of this pass of the compiler, and also the pass will update the information in the loop information database. An arrow from a block in Pass 2 of the compiler to the loop information database indicates that it is updating the information that is in the loop information database, and that information in the database is not driving the phase.

Step three also determines which basic blocks belong to the different loops, This information is needed in box 207 for the placement of the instrumentation code at the loop entry and exit points. This determination is conducted in the following manner. The basic blocks that are detected by Pass 2 in box 203 are traversed from the innermost to the outermost loop. A loop ID is created for each loop, if not already present in the head of the loop, recorded in the database, and placed in the basic block that is present inside the loop. The loop interval analysis tells which basic block is inside the loop. This is done for all basic blocks that are inside the loop, including the head of the loop, if the blocks do not already belong to another loop (i.e they do not already contain a loop ID). Thus, any of the information that is present in the database under this loop ID corresponds to these basic blocks. If the loop analysis phase does not provide any information about the exit points of the loop, then all the basic blocks of the loop are traversed (loop interval analysis determines the basic blocks in loops) and checked for their successors. If a basic block in the loop has a successor that is not inside the loop, then the basic block is an exit block of the loop.

In the later steps of the compilation process, where interval analysis data structures are not present, a basic block is deemed to be inside the loop, if the basic block has the loop ID recorded in it of the loop that under consideration. During step four, the list of entry basic blocks and exit basic blocks is recorded in the loop information database, along with the type of the exit, wherein an exit is either an implicit exit or explicit exit, as defined in the co-pending commonly assigned U.S. patent application, Ser. No. [47607-P057US-971750] entitled LOOP PROFILING BY INSTRUMENTATION, the disclosure of which is incorporated herein by reference. These items in the LID database are used later by the instrumentation code generation, which comes in step five of the technique. The loops entry and exit points in the LID database 110, along with the unique identifier, are recorded in the LID database 110, so that the instrumentation code can be inserted later during the Code Generation phase at these entry and exit points.

Step five of the technique places the instrumentation code, as depicted in boxes 206 and 207 in FIG. 2. In this phase, all the loops in the LID database are iterated over for the purpose of generating the instrumentation code for all the entry and exit points of the loop. The manner in which this instrumentation code is placed is referred to in the disclosure of the above referenced patent application incorporated herein by reference. However, it is possible that the information that is recorded in the database is wrong because of the optimizations that have taken place in box 205 of FIG. 2. A series of heuristics are used to check whether the loops are valid or invalid in box 206. The first heuristic states that there must be at least one entry and at least one exit inside the loop. This can be easily checked because this information is already recorded inside the database. Each entry basic block that belongs to a particular loop is reviewed to determine whether it has correct loop ID or not. The same check is also performed on exit basic blocks. The second heuristic states that the loop to which the basic block of the entry instruction of the loop belongs must be the same as the loop in the loop information database. This is checked by looking at the recorded loop ID in the basic block with the loop ID stored in the loop information database and the entry block stored with that loop. This can fail if there is some code motion in box 205 which has moved the head of the loop. For example, scheduling or path cloning tends to perform some code motion which can invalidate the information that is recorded in the loop information database. The third heuristic states that there must be at least one basic block outside the loop which is a predecessor of the entry basic block of the loop. Path cloning is one optimization which tends to violate this assumption and therefore, this check needs to be performed. Essentially this heuristic states that there is a flow of control from outside of the loop to the inside of the loop. The fourth heuristic states that if an exit is an implicit exit, then the loop to which the head belongs to must enclose the loop to which the implicit exit belongs. An exit is an implicit exit if control is transferred to the head of the loop. The heuristic essentially says that basic blocks having the implicit exit must belong to a loop which is enclosed by the loop to which it belongs. This can be easily checks since the loop information database stores the nesting information of the loops. The fifth heuristic states that if the exit is an explicit exit, then the target of the exit must not be inside the loop, i.e. the target of this loop should be a basic block which contains a different loop ID (or no loop ID) than the one which is present in the loop to which the current basic block belongs.

Step six of the technique generates the fixups so that the linker (not shown) can appropriately place the loop entry and exit addresses in the LID database. At this point, the loop entry and exits are just symbolic addresses, not actual addresses. During the link phase of the compilation process, these symbolic addresses are replaced by the actual addresses, since it is only then that the actual addresses will be known. But we need to generate instructions to the linker to replace the symbolic addresses with actual addresses for each symbolic address. These instructions are called fixups. This corresponds to box 208 in FIG. 2.

At the end of Pass 2, the intermediate representation 109 that was being massaged by Pass 2 will be transformed into object code 111 and outputted as an object code file, or ".O" file. If there is a Pass 3 (not shown), then the whole technique that was performed with respect to Pass 1 and Pass 2 is repeated again. Therefore, this technique can work with multiple passes in the compiler.

As shown in FIG. 2, the recording of the information is done in box 203 and the generation of the code is performed in box 207. In between 203 and 207, there are various optimizations in box 205 are unrelated to the loop optimizations that are performed in box 203, or the instrumentation code generation in box 207. Thus, any number of optimizations in box 205 can be performed, depending on the requirements to produce the best, optimal code, while not being concerned about any of the effect that this might have on the information that is recorded in the loop information database. The heuristics ensure that the information that is in the database is valid. This will enable a compiler developer to place the optimizations in any order to attain the optimal generation of the code.

As shown in FIG. 2, the instrumentation code is generated at the loop entry and exit points immediately before the generation of the object code. This is possible because of the separation of the manner in which the loop information is collected from the generation of the loop instrumentation code. The loop instrumentation code can be generated just before the object code generation, thus there will not be any optimizations that are performed after the instrumentation code is generated. Therefore, the problem of optimizing away the instrumentation code is completely eliminated.

Since the loop analysis phase has been separated from the instrumentation code generation phase, the loop analysis does not have to be performed again just before placing the instrumentation code at the loop entries and exits. This is addressed by the recording of the loop IDs in the basic blocks that are present inside the loops in step three.

Although the present invention and its advantages have been described in detail, it should be understood that various changes, substitutions and alterations can be made herein without departing from the spirit and scope of the invention as defined by the appended claims.

What is claimed is:

1. A method for tracking information about at least one loop in a section of computer program code that is being processed by a compiler, wherein the information is stored in a database that is separate from the compiler, the method comprising the steps of:

detecting the one loop in the code;

assigning the detected one loop a unique identifier;

analyzing the one loop to determine a flow of control in the one loop;

representing the flow as a dataflow graph of basic blocks;

recording a list of loop entry basic blocks and loop exit basic blocks in the database;

performing a loop optimization: and recording any changes to the one loop from the step of performing in the database.

2. The method of claim 1, wherein the step of detecting the one loop comprises:

determining at least one entry point and at one exit point of the loop; and recording the entry and exit points in the database.

3. The method of claim 1, wherein the step of assigning comprises the step of:

recording the identifier in the database.

4. The method of claim 1, wherein the step of analyzing the one loop comprises the steps of:

recording loop entry points and exit points into the basic blocks; and recording a loop identifier into the basic blocks.

5. The method of claim 1 further comprising the step of:

destroying the dataflow graph after the step of recording any changes has been performed.

6. The method of claim 5, further after the step of destroying the dataflow graph has been performed, the method further comprises the steps of:

performing a non-loop optimization;

recording any changes to the one loop from the step of performing in the database.

7. The method of claim 1, wherein the one loop is a loop within a loop nest, and the step of analyzing the one loop determines which loops of the loop nest to which the basic blocks belong, the step of analyzing comprises the steps of:

creating a loop identifier for each loop in the loop nest;

traversing the loop nest from the innermost loop to the outermost loop;

assigning a loop identifier to each basic block that does not already have a loop identifier;

determining at least one exit point for each loop in the loop nest; and recording the loop identifier, all entry blocks, and all exit blocks for each loop in the loop nest into the database.

8. The method of claim 7, wherein the step of determining at least one exit point comprises the steps of:

determining each basic block of a particular loop;

identifying a successor block to a particular basic block of the particular loop; and determining whether the successor block is in the particular loop, wherein if the successor block is not in the particular loop, then the particular basic block is an exit point of the particular loop.

9. The method of claim 8, wherein the step of determining at least one exit point further comprising the step of:

repeating the step of identifying a successor block and the step of determining whether the successor block is in the particular loop, for each basic block of the particular loop.

10. The method of claim 1, further comprises the steps of:

determining whether information stored in the database is valid; and inserting instrumentation code at valid loop entry points and valid loop exit points in the one loop.

11. The method of claim 10, wherein the step of determining whether information stored in the database is valid comprises the steps of:

(a) determining whether the information indicates that there is at least one entry point and at least one exit point in the one loop;

(b) determining whether a loop identifier of an entry point of the loop is the same as the information of the one loop;

(c) determining whether the information indicates that there is a flow of control from outside the one loop to inside the one loop;

(d) determining, if an exit point of the one loop is an implicit exit, whether a loop identifier of an entry point of the one loop matches the information of the one loop; and (e) determining, if an exit point of the one loop is an explicit exit, whether a target of the explicit exit is outside the one loop;

wherein if any one of the steps (a) through (e) yields an incorrect result, then the information about the one loop is invalid.

12. A method for determining whether information stored in a database about at least one loop of computer program code is valid, the method comprising the steps of:

(a) determining whether the information indicates that there is at least one entry point and at least one exit point in the one loop;

(b) determining whether a loop identifier of an entry point of the loop is the same as the information of the one loop;

(c) determining whether the information indicates that there is a flow of control from outside the one loop to inside the one loop;

(d) determining, if an exit point of the one loop is an implicit exit, whether a loop identifier of an entry point of the one loop matches the information of the one loop; and (e) determining, if an exit point of the one loop is an explicit exit, whether a target of the explicit exit is outside the one loop;

wherein if any one of the steps (a) through (e) yields an incorrect result, then the information about the one loop is invalid.

13. The method of claim 12, wherein the one loop is represented as a plurality of basic blocks, and the step (a) further comprises the step of:

reviewing information stored in the database about each basic block of the loop to determine which basic blocks are entry points and which basic block are exit points.

14. The method of claim 12, wherein the one loop is represented as a plurality of basic blocks, and the step (b) further comprises the step of:

reviewing information stored in the database about each basic block of the loop comparing the loop identifier of the basic block of the entry point with the loop identifier stored in the database.

15. The method of claim 12, wherein the one loop is represented as a plurality of basic blocks, and the step (c) further comprises the step of:

determining whether there is at least one basic block outside of the one loop, which is a predecessor in control flow of an entry basic block of the one loop.

16. The method of claim 12, wherein the one loop is represented as a plurality of basic blocks, and the step (d) further comprises the step of:

reviewing information stored in the database to determine if a loop to which the basic block of the entry point belongs, also encloses the basic block of the exit point.

17. The method of claim 12, wherein the step (e) further comprises the step of:

determining whether the target has a loop identifier that is different from the loop identifier for the one loop.

18. A system for tracking information about at least one loop in a section of computer program code that is being processed by a compiler, wherein the information is stored in a database that is separate from the compiler, the system comprising:

means for detecting the one loop in the code;

means for assigning the detected one loop a unique identifier;

means for analyzing the one loop to determine a flow of control in the one loop;

means for representing the flow as a dataflow graph of basic blocks;

means for recording a list of loop entry basic blocks and loop exit basic blocks in the database;

means for performing a loop optimization on the detected one loop; and means for recording any changes to the one loop caused by the means for performing in the database.

19. The system of claim 18, wherein the means for detecting the one loop comprises:

means for determining at least one entry point and at one exit point of the loop; and means for recording the entry and exit points in the database.

20. The system of claim 18, wherein the means for assigning comprises:

means for recording the identifier in the database.

21. The system of claim 18, wherein the means for analyzing the one loop comprises:

means for recording loop entry points and exit points into the basic blocks; and means for recording a loop identifier into the basic blocks.

22. The system of claim 18 further comprising:

means for destroying the dataflow graph after the means for recording any changes has operated.

23. The system of claim 22, further after the means for destroying the dataflow graph has operated, the system further comprises:

means for performing a non-loop optimization;

means for recording any changes to the one loop caused by the means for performing in the database.

24. The system of claim 18, wherein the one loop is a loop within a loop nest, and the means for analyzing the one loop determines which loops of the loop nest to which the basic blocks belong, the means for analyzing comprises:

means for creating a loop identifier for each loop in the loop nest;

means for traversing the loop nest from the innermost loop to the outermost loop;

means for assigning a loop identifier to each basic block that does not already have a loop identifier;

means for determining at least one exit point for each loop in the loop nest; and means for recording the loop identifier, all entry blocks, and all exit blocks for each loop in the loop nest into the database.

25. The system of claim 24, wherein means for determining at least one exit point comprises:

means for determining each basic block of a particular loop;

means for identifying a successor block to a particular basic block of the particular loop; and means for determining whether the successor block is in the particular loop, wherein if the successor block is not in the particular loop, then the particular basic block is an exit point of the particular loop.

26. The system of claim 25, wherein:

the means for identifying a successor block and the means for determining whether the successor block is in the particular loop, operate on each basic block of the particular loop.

27. The system of claim 18, further comprises:

means for determining whether information stored in the database is valid; and means for inserting instrumentation code at valid loop entry points and valid loop exits points in the one loop.

28. The system of claim 27, wherein the means for determining whether information stored in the database is valid comprises:

means for determining whether the information indicates that there is at least one entry point and at least one exit point in the one loop;

means for determining whether a loop identifier of an entry point of the loop is the same as the information of the one loop;

means for determining whether the information indicates that there is a flow of control from outside the one loop to inside the one loop;

means for determining, if an exit point of the one loop is an implicit exit, whether a loop identifier of an entry point of the one loop matches the information of the one loop; and means for determining, if an exit point of the one loop is an explicit exit, whether a target of the explicit exit is outside the one loop.

* * * * *